May 29, 1962 F. HAUPT 3,036,475
GEAR ASSEMBLY IN WHICH A DRIVE FROM A DRIVING SHAFT
TO A DRIVEN SHAFT IS DISTRIBUTED THROUGH TWO
PARALLEL INTERMEDIATE SHAFTS
Filed July 1, 1960 2 Sheets-Sheet 1

Inventor
Fritz Haupt
By
Wenderoth, Lind & Ponack
Attorneys

United States Patent Office 3,036,475
Patented May 29, 1962

3,036,475
GEAR ASSEMBLY IN WHICH A DRIVE FROM A DRIVING SHAFT TO A DRIVEN SHAFT IS DISTRIBUTED THROUGH TWO PARALLEL INTERMEDIATE SHAFTS
Fritz Haupt, Zurich, Switzerland, assignor to Maag Gear Wheel & Machine Company Limited, Zurich, Switzerland
Filed July 1, 1960, Ser. No. 40,278
Claims priority, application Switzerland July 9, 1959
7 Claims. (Cl. 74—410)

This invention relates to a gear assembly in which the drive from a driving shaft to a driven shaft is distributed through two parallel intermediate shafts both of which are connected to the driving and driven shafts, and to means for equalizing the loads on the two intermediate shafts.

Gear assemblies of the kind referred to are known in which uniform load distribution has been achieved by incorporation of torsion shafts in the intermediate shafts. This method of construction, however, requires a relatively large number of bearings, and results in considerable over-all lengths with correspondingly heavy casings.

An object of the present invention is to ensure uniform load distribution through the intermediate shafts satisfactorily at one predetermined load, without involving any substantial increase in size and cost of the gear assembly.

A gear assembly of the kind referred to is characterized in that the driving shaft adjusts itself automatically to equalize the load distribution in both directions of rotation, for a predetermined load, through the two parallel intermediate shafts, the movement of the axis of the driving shaft to obtain said adjustment being effected substantially in the plane containing the axes of driving and driven shafts and a plane perpendicular to the axis of the driving shaft, and a force vertical component in the direction of the intersecting straight line of the said planes is taken up by an equally large force acting on the driving shaft from the exterior.

The invention is illustrated in the accompanying drawings, wherein.

Figure 1:
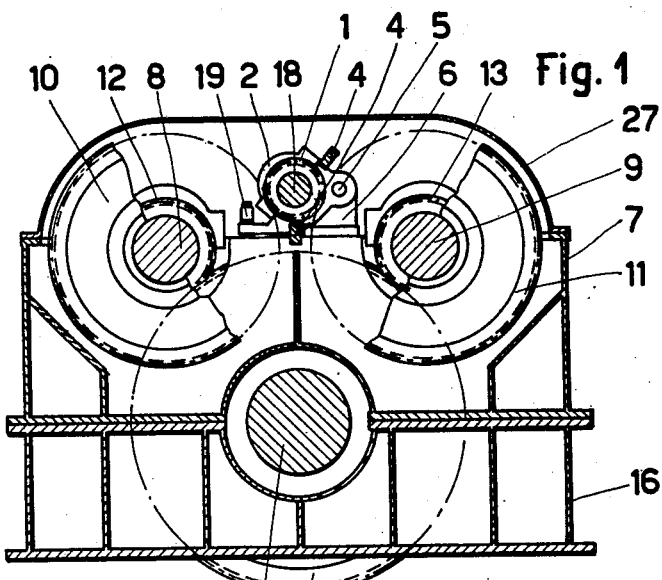
FIGURE 1 is a sectional view of one form of the invention, taken on section line I—I of FIGURE 2.

A gear wheel 1 is mounted on a driving shaft 18 which is journalled on both axial sides of the gear wheel 1 in bearings 2 and 3 which are connected together by yokes 4 in a manner resistant to bending and torsion. The bearings 2 and 3 are mounted for rocking in common about a pivot 5. A bearing bracket 6, in which the pivot 5 is fixed, is mounted on a casing 7.

Two intermediate shafts 8 and 9 are journalled in the casing 7. Transmission gear wheels 10 and 11, which each mesh with the driving gear wheel 1, are mounted rigidly on the shafts 8 and 9, respectively. Transmission gear wheels 12 and 13 also are mounted rigidly on the shafts 8 and 9, respectively, and each wheel 12 and 13 meshes with a driven gear wheel 14 which is mounted on a driven shaft 15.

The shaft 15 is journalled in the casing 7 and its base 16. Besides the bearing bracket 6, a further bearing bracket 17 is fixed to or combined with the casing 7 and carries an axial or thrust bearing, for example a Michell bearing, which prevents axial movement of the shaft 18 and takes up any axial thrusts of the said shaft. The shaft 18, however, can move freely in the axial or thrust bearing in an arcuate direction about the pivot 5.

The shaft 18 is preferably driven by a flexible coupling, for example a toothed coupling, not shown, which is movable to an extent such that it can readily take up small rocking movements of the bearings 2 and 3. These rocking or adjusting movements automatically provide for the load equalization of the power transmission through the two intermediate shafts 8 and 9.

If the gear wheel 1 mounted on the driving shaft rotates in the anti-clockwise direction (FIG. 3), for example as forward speed, the forces shown in solid lines act on its bearings. The arrow ZV1 shows the tooth force of the intermediate transmission gear wheel 10 on the driving gear wheel 1, while the arrow ZV2 shows the tooth force of the intermediate transmission gear wheel 11 on the driving gear wheel 1. If the tooth forces ZV1 and ZV2, assumed to be equal in magnitude, are displaced parallel to themselves on to the axis of the driving gear wheel 1 a resultant force RV is obtained, with the component V in the direction of the free, that is automatic, adjusting movement of the driving wheel vertically upward. This direction is identical with the direction of the plane through the axes of driving and driven shafts and of a plane perpendicular to the axis of the driving shaft. The horizontal component is denoted by H.

To prevent the axis of the driving wheel 1 yielding in the direction and under the influence of the component V, a spring 31 (FIGURE 4) exerts a continuous pressure, corresponding to the component V, on the bearing of the driving wheel 1, but in the opposite direction, that is, vertically downward. The force of the spring 31 is transmitted by means of a screw 27, a nut 28, a sleeve 29 and a distance bushing 30 (FIGURES 4 and 5) to the casing 7. The axis of the driving wheel 1 is thus in equilibrium and the two tooth pressures ZV1 and ZV2 are equal to each other, as assumed for a predetermined load, load equalization of the loads on the parallel intermediate shafts 8 and 9 being also achieved. In the case of a load differing from the predetermined load, the resultant RV' is obtained, displaced in direction and magnitude (dot-and-dash line), since the vertical spring force remains constant at the value of the predetermined force component V. Load equalization is thus available only for the predetermined load.

Figure 3:
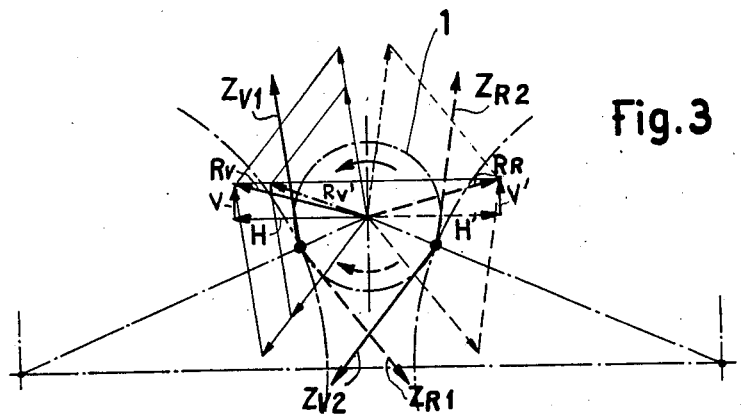
FIGURE 3 is a diagram showing the different forces acting on the bearings of the driving shaft.

FIGURE 3 shows, on the contrary, with reference to the broken lines, that for the opposite direction of rotation of the driving wheel 1, that is, in the clockwise direction (FIGURE 3) for the same predetermined load, load equalization of the parallel intermediate shafts 8 and 9 is also obtained by means of the same spring 31. Tooth forces ZR1 and ZR2, displaced to the axis of the driving wheel 1, give a resultant RR with the vertical component V' and the horizontal component H'.

In order, in the event of excessive deviation from the predetermined load, to prevent excessive displacement of the axis of the driving wheel 1, a little space is left between the sleeve 29 and the bearing 2, 3, or the bearing 23 (FIGURE 4), and the casing 7. In this case the bearing 2, 3, or 23, can thereby be supported on the sleeve 29 or the casing 7.

A cover 27 is provided on the casing 7.

Figure 4:
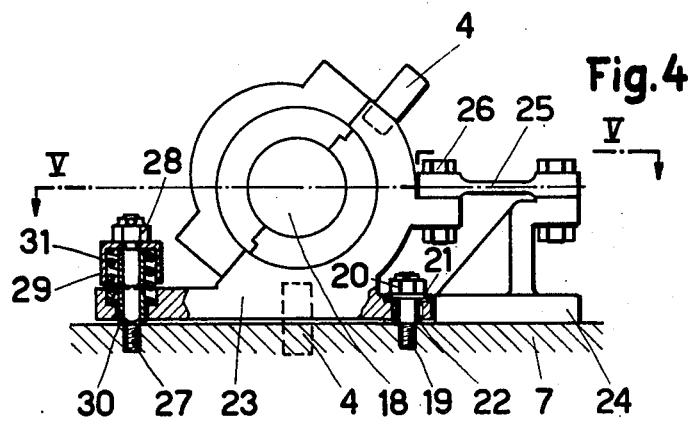
FIGURE 4 is an enlarged elevation of a modified form of a detail, partly in section on line IV—IV of FIGURE 5.
Figure 5:
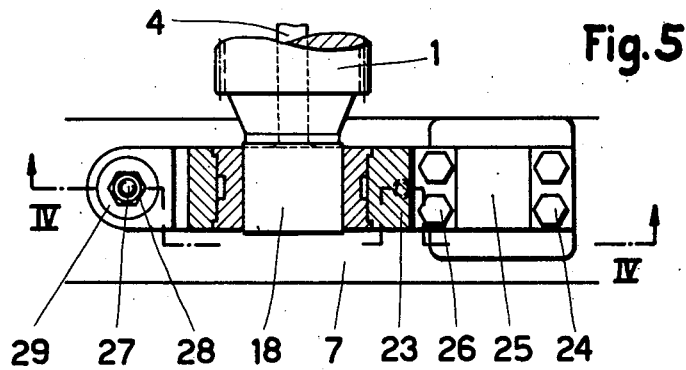
FIGURE 5 is a plan view of FIGURE 4.

FIGURES 4 and 5 show a modification of the means which permit rocking adjustment of the driving shaft 18. A bracket 24 together with a web 25 is secured to the casing 7. A bearing 23 is connected by a screw 26 to the web 25, which possesses a certain elasticity and permits deviation in the vertical direction. The web 25 lies in the line of the horizontal component H (FIGURE 3).

Figure 2:
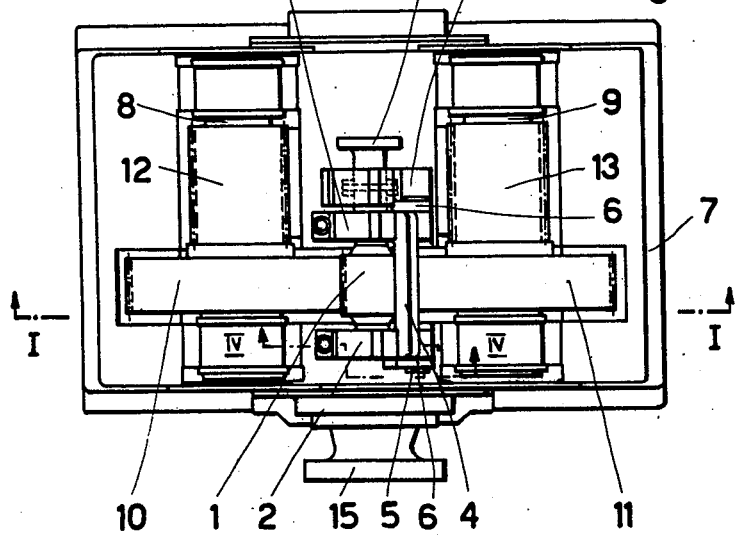
FIGURE 2 is a plan view corresponding to FIGURE 1 with the cover removed.

The yokes 4 connect the bearing 23 to another bearing similar to bearing 3 (FIGURE 2).

To prevent excessive deflection of the web 25 in the event of exceptional loads, a screw 19 is provided, with nut 20, washer 21 and distance bushing 22, whereby in such a case the bearing 23 is supported on the casing 7 or on the washer 21. These limiting elements 19, 20, 21 and 22 also become operative in the event of considerable load variations, like the limiting elements 27, 28, 29 and 30.

In the arrangement described and shown, full load equalization through the parallel intermediate shafts 8 and 9 is obtained in both directions of rotation and for a predetermined load of the gear, since the component V and V' remains the same for both directions of rotation. For obtaining load equalization, it is merely necessary to have free adjustment in the plane of the two axes of driving and driven wheel and perpendicular to the axis of the driving wheel, which is made possible by means of the arrangement shown.

Manufacturing tolerances have an extremely small influence on the load distribution, since slight displacements of the driving wheel from the theoretical position or slight deviations of the spring force from the required value result in merely insignificant variations in the components $ZV_1$ and $ZV_2$ or $ZR_1$ and $ZR_2$. On this is based the equality of the tooth pressures on the two transmission wheels 10 and 11 and hence also the equalization of load on the two intermediate shafts 8 and 9.

The invention may also be applied to a plurality of driving shafts, in which case, however, two parallel intermediate shafts acting on the same driven shaft are associated with each driving shaft.

The terms "horizontal" and "vertical" have been selected for reasons of clarity. In the case of another arrangement of the position of the shafts relatively to each other, the appropriate expressions will apply.

Adjustment of the axis of the driving shaft 18 in the said direction may also be effected by means of a rectilinear guide within the scope of the invention. The adjustment by rocking on the pivot 5, as shown, gives the theoretical required direction at only one point; the result thereby attained in practice is perfectly satisfactory, as is also that by means of the web 25.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:
1. A gear assembly comprising a driving shaft having a gear, a driven shaft having a gear, two parallel intermediate shafts having gears interposed between and meshing with said driving and driven shaft gears, said driving shaft adjusting itself automatically to equalize the load distribution in both directions of rotation, for a predetermined load, through said two parallel intermediate shafts, said means causing a movement of the axis of said driving shaft to obtain said adjustment to be effected substantially in the plane containing the axes of said driving and driven shafts and a plane perpendicular to the axis of said driving shaft, and a force vertical component in the direction of the intersecting straight line of said planes is taken up by an equally large force acting on said driving shaft from the exterior.

2. A gear assembly as set forth in claim 1 wherein said automatic adjustment of said driving shaft is obtained by mounting said shaft to rock about a pivot the axis of which lies in the plane of the line of a horizontal component of the tooth force and is parallel to the driving shaft axis.

3. A gear assembly as set forth in claim 1 wherein said automatic adjustment of the driving shaft is obtained by mounting said shaft on a resilient web which lies substantially in the plane of the line of action of a horizontal component of the tooth force.

4. A gear assembly as set forth in claim 1 wherein the vertical component, corresponding to a predetermined load, is compensated by means of a spring.

5. A gear assembly as set forth in claim 1 wherein said adjustability is restricted by limiting elements in narrow, adjustable tolerances.

6. A gear assembly as set forth in claim 3 wherein the deflection of said resilient web is restricted by means of limiting elements in narrow, adjustable tolerances.

7. A gear assembly as set forth in claim 1 wherein said driving shaft is rockably journalled on both sides of a gear wheel mounted thereon, and is held fast against axial movement by a stationary bearing.

References Cited in the file of this patent
UNITED STATES PATENTS

| | | |
|---|---|---|
| 1,455,421 | Ayers | May 15, 1923 |
| 1,591,826 | Hodgkinson | July 6, 1926 |
| 1,621,053 | Besse | Mar. 15, 1927 |
| 1,847,611 | Hodgkinson | Mar. 1, 1932 |
| 2,114,660 | Thalmann | Apr. 19, 1938 |
| 2,337,501 | Schmidt | Dec. 21, 1943 |
| 2,513,217 | Tomlines | June 27, 1950 |
| 2,638,388 | Tunley | May 12, 1953 |